United States Patent
McElroy et al.

(10) Patent No.: US 7,045,233 B2
(45) Date of Patent: May 16, 2006

(54) METHOD AND APPARATUS FOR ELECTROCHEMICAL COMPRESSION AND EXPANSION OF HYDROGEN IN A FUEL CELL SYSTEM

(75) Inventors: James F. McElroy, Suffield, CT (US); Arne W. Ballantine, Round Lake, NY (US); Richard L. Chartrand, Mechanicville, NY (US)

(73) Assignee: Plug Power Inc., Latham, NY (US)

( * ) Notice: Subject to any disclaimer, the term of this patent is extended or adjusted under 35 U.S.C. 154(b) by 555 days.

(21) Appl. No.: 10/214,022

(22) Filed: Aug. 7, 2002

(65) Prior Publication Data

US 2004/0028965 A1 Feb. 12, 2004

(51) Int. Cl.
*H01M 8/06* (2006.01)
*H01M 8/04* (2006.01)

(52) U.S. Cl. .............................. 429/19; 429/22; 429/23; 429/25

(58) Field of Classification Search ...................... None
See application file for complete search history.

(56) References Cited

U.S. PATENT DOCUMENTS

| | | | |
|---|---|---|---|
| 5,688,611 A | 11/1997 | Golben | 429/53 |
| 6,124,060 A | 9/2000 | Akita et al. | 429/307 |
| 6,168,705 B1 * | 1/2001 | Molter et al. | 205/637 |
| 6,280,865 B1 * | 8/2001 | Eisman et al. | 429/17 |
| 6,569,298 B1 | 5/2003 | Merida-Donis | 204/263 |
| 6,833,206 B1 | 12/2004 | Erdle et al. | 429/17 |
| 6,858,336 B1 | 2/2005 | Reiser et al. | 429/13 |
| 2002/0068206 A1 * | 6/2002 | Suzuki et al. | 429/20 |
| 2002/0114984 A1 | 8/2002 | Edlund et al. | 429/19 |
| 2004/0028960 A1 | 2/2004 | McElroy et al. | |
| 2004/0028979 A1 | 2/2004 | Ballantine et al. | |

\* cited by examiner

*Primary Examiner*—Jonathan Crepeau
(74) *Attorney, Agent, or Firm*—Trop, Pruner & Hu, P.C.

(57) ABSTRACT

The invention relates to fuel cell systems and associated methods of operation where an electrochemical cell such as a fuel cell is used as an electrochemical hydrogen separator to separate hydrogen from a process stream (e.g., reformate or synthesis gas), or as an electrochemical hydrogen expander to inject hydrogen into a process stream. In one aspect, the invention provides a method of operating a fuel cell system, including the following steps: flowing hydrogen from a hydrogen supply conduit through a fuel cell to provide an electric current to a load coupled to the fuel cell; actuating an electrochemical hydrogen separator in a first mode of operation of the system to transfer hydrogen from the hydrogen supply conduit to a hydrogen storage vessel; and actuating an electrochemical hydrogen expander in a second mode of operation of the system to transfer hydrogen from the hydrogen storage vessel to the fuel cell.

47 Claims, 9 Drawing Sheets

METHOD AND APPARATUS FOR ELECTROCHEMICAL COMPRESSION AND EXPANSION OF HYDROGEN IN A FUEL CELL SYSTEM

BACKGROUND

The invention relates to fuel cell systems and associated methods of operation where an electrochemical cell such as a fuel cell is used as an electrochemical hydrogen separator to separate hydrogen from a process stream, or as an electrochemical hydrogen expander to inject hydrogen into a process stream.

A fuel cell is an electrochemical device that converts chemical energy produced by a reaction directly into electrical energy. For example, one type of fuel cell includes a polymer electrolyte membrane (PEM), often called a proton exchange membrane, that permits only protons to pass between an anode and a cathode of the fuel cell. At the anode, diatomic hydrogen (a fuel) is reacted to produce protons that pass through the PEM. The electrons produced by this reaction travel through circuitry that is external to the fuel cell to form an electrical current. At the cathode, oxygen is reduced and reacts with the protons to form water. The anodic and cathodic reactions are described by the following equations:

$$H_2 \rightarrow 2H^+ + 2e^- \quad (1)$$

at the anode of the cell, and

$$O_2 + 4H^+ + 4e^- \rightarrow 2H_2O \quad (2)$$

at the cathode of the cell.

A typical fuel cell has a terminal voltage of up to about one volt DC. For purposes of producing much larger voltages, multiple fuel cells may be assembled together to form an arrangement called a fuel cell stack, an arrangement in which the fuel cells are electrically coupled together in series to form a larger DC voltage (a voltage near 100 volts DC, for example) and to provide more power.

The fuel cell stack may include flow field plates (graphite composite or metal plates, as examples) that are stacked one on top of the other. The plates may include various surface flow field channels and orifices to, as examples, route the reactants and products through the fuel cell stack. A PEM is sandwiched between each anode and cathode flow field plate. Electrically conductive gas diffusion layers (GDLs) may be located on each side of each PEM to act as a gas diffusion media and in some cases to provide a support for the fuel cell catalysts. In this manner, reactant gases from each side of the PEM may pass along the flow field channels and diffuse through the GDLs to reach the PEM. The PEM and its adjacent pair of catalyst layers are often referred to as a membrane electrode assembly (MEA). An MEA sandwiched by adjacent GDL layers is often referred to as a membrane electrode unit (MEU).

A fuel cell system may include a fuel processor that converts a hydrocarbon (natural gas or propane, as examples) into a fuel flow for the fuel cell stack. For a given output power of the fuel cell stack, the fuel flow to the stack must satisfy the appropriate stoichiometric ratios governed by the equations listed above. Thus, a controller of the fuel cell system may monitor the output power of the stack and based on the monitored output power, estimate the fuel flow to satisfy the appropriate stoichiometric ratios. In this manner, the controller regulates the fuel processor to produce this flow, and in response to the controller detecting a change in the output power, the controller estimates a new rate of fuel flow and controls the fuel processor accordingly.

A fuel cell may also operate on pure hydrogen or other streams containing hydrogen such as synthesis gas. In some cases, especially at operating temperatures lower than 100° C., carbon monoxide may poison fuel cell catalysts (e.g., platinum), so it may be desired to remove carbon monoxide from such a stream (e.g., to less than 50 parts per million) before flowing it through a fuel cell. Some fuel cell membrane materials such as the polybenzimidazole membrane available from Celanese operate at higher temperatures (e.g., greater than 120° C.), so that carbon monoxide is less of a concern in this respect. Direct methanol fuel cells are also known that can react methanol directly to achieve proton exchange through the fuel cell membrane.

The fuel cell system may provide power to a load, such as a load that is formed from residential appliances and electrical devices that may be selectively turned on and off to vary the power that is demanded by the load. Thus, the load may not be constant, but rather the power that is consumed by the load may vary over time and abruptly change in steps. For example, if the fuel cell system provides power to a house, different appliances/electrical devices of the house may be turned on and off at different times to cause the load to vary in a stepwise fashion over time. Fuel cell systems adapted to accommodate variable loads are sometimes referred to as "load following" systems.

There is a continuing need for integrated fuel cell systems and associated process designed to achieve objectives including the forgoing in a robust, cost-effective manner.

SUMMARY

In one aspect, the invention provides a fuel cell system with an electrochemical transfer cell. As functionally defined herein, an electrochemical transfer cell refers to an electrochemical cell that can be used as an electrochemical hydrogen separator, or an electrochemical hydrogen expander, or both. An electrochemical cell in this context refers to a device that has two electrodes sandwiching a proton or electron conductive membrane (e.g., a PEM fuel cell). An electrochemical hydrogen separator in this context refers to an electrochemical cell that is used to electrochemically separate hydrogen from a fluid such as reformate. An example could be a fuel cell stack with no external electrical load onto which a voltage is provided. For illustration purposes, U.S. Pat. No. 6,280,865 is hereby incorporated by reference in its entirety. An electrochemical hydrogen expander in this context refers to an electrochemical cell that is used to pump hydrogen from a hydrogen concentrated electrode to an electrode less concentrated with hydrogen. For illustration purposes, U.S. patent Ser. No. 09/540,673 now U.S. Pat. No. 6,455,181 is hereby incorporated by reference in its entirety.

In one embodiment, a fuel cell, a hydrogen flow circuit (e.g., a hydrogen supply conduit leading to the fuel cell or a hydrogen exhaust conduit from the fuel cell), an electrochemical transfer cell, and a hydrogen storage vessel (e.g., a pressure tank or any enclosure or flow circuit adapted to buffer a flow of hydrogen) are provided in the system. The fuel cell is adapted to receive hydrogen from the hydrogen flow circuit. The hydrogen storage vessel is coupled in fluid communication to the electrochemical transfer cell. In the context of this invention, the term "coupled" refers in a generic sense to any connection, either direct or indirect (e.g., in the case of an indirect connections, other devices may be positioned between the devices that are eventually "coupled" in a functional relationship). The electrochemical transfer cell is adapted to transfer hydrogen from the hydrogen flow circuit to the hydrogen storage vessel when an electrical potential is placed on the cell (e.g., by connecting a power supply such as a battery or a fuel cell to the electrodes). The electrochemical transfer cell is adapted to transfer hydrogen from the hydrogen storage vessel to the hydrogen flow circuit when an electrical load is placed on the cell. An electrical load may refer to any electrical connection to which electrical current may be flowed.

The system has a first operating mode in which the electrochemical transfer cell transfers hydrogen from the hydrogen flow circuit to the hydrogen storage vessel. The system has a second operating mode in which the electrochemical transfer cell transfers hydrogen from the hydrogen storage vessel to the hydrogen flow circuit.

In some embodiments, the system further includes a fuel processor (also referred to as a reformer, without respect to the reaction employed) coupled to the hydrogen flow circuit and adapted to supply reformate to the hydrogen flow circuit.

In some embodiments, the system further includes a compressor coupled between the electrochemical transfer cell and the hydrogen storage vessel and adapted to pressurize the hydrogen storage vessel. A vessel outlet conduit may also be provided between the hydrogen storage vessel and the electrochemical transfer cell with a pressure regulator located along the vessel outlet conduit to regulate a pressure of hydrogen supplied to the electrochemical transfer cell from the hydrogen storage vessel. As examples, the compressor can have an outlet pressure of greater than 1000 psia, or greater than 3000 psia. In some cases, it may be desirable to operate the storage vessel as pressures around 5000 psia. In embodiments where the transfer cell can withstand such pressures, it may be desirable to eliminate the compressor and rely on the transfer cell to provide the pressure to the storage vessel.

In some embodiments, the fuel cell is a stationary fuel cell, such as one of the residential PEM systems manufactured by Plug Power, Inc. The system can further include an outlet valve coupled to the hydrogen storage vessel to allow hydrogen to be transferred from the hydrogen storage vessel to a secondary hydrogen storage vessel, such as a hydrogen tank associated with a hydrogen powered vehicle.

In some embodiments, a system controller can be provided to switch the system between the first and second operating modes described above. As an example, an electrical load may be connected to the fuel cell and monitored by the controller (e.g., by monitoring the power output and voltage effects on the fuel cell) such that the controller switches the system to the first mode when the load is below a first predetermined threshold (e.g., a fuel cell in a fuel cell stack falls below a threshold such as 0.6 volts), and the controller switches the system to the second mode when the load is above a second predetermined threshold (e.g., a fuel cell in a fuel cell stack with the lowest voltage is above a threshold such as 0.8).

This determination generally relates to the stoichiomteric ratio of hydrogen provided to the fuel cell with respect to the amount demanded by the electrical load, and may beconducted according to various methods. For example, the magnitude of the load may be measured or calculated in terms of power and compared to the power output of the fuel cell. Alternatively, the excess hydrogen from the fuel cell can be measured to determine whether hydrogen in present in an amount exceeding what is desired (e.g., 125% of the theoretical amount necessary to satisfy the load). Alternatively, a minimum cell voltage of the fuel cell stack may be monitored to determined when the voltage falls below a threshold (e.g., 0.7 volts), indicating that additional hydrogen is needed by the fuel cell. A lookup table may be used to correlate operating conditions to load conditions. Other methods are known in the art for measuring or calculating whether a load on a fuel cell is above or below a desired threshold, and the parameters associated with the "thresholds" monitored under such embodiments of the present invention are accordingly associated with the parameters used by such methods.

In some embodiments, an outlet of the electrochemical transfer cell is coupled to the reformer and adapted to supply hydrogen to the reformer. For example, the hydrogen can be used to increase the amount of hydrogen in the reformate. In other embodiments, an outlet of the electrochemical transfer cell can be coupled to the hydrogen supply conduit, which can also be referred to as an inlet conduit of the fuel cell.

Systems and methods under the present invention may also be used in combined heat and power (CHP) systems. For example, the system may include a coolant circuit adapted to transfer heat from the system to a heat sink. Heat may be removed during operation from the fuel cell, the reformer, an exhaust gas oxidizer, or other components that may be present. A heat sink may include, as examples, a industrial and potable hot water tanks, heat exchangers for external applications, air heating systems for homes or buildings, etc.

In some embodiments, an oxidant flow circuit (e.g., air or oxygen) may be selectively coupled to the electrochemical transfer cell. The term "flow circuit" generically refers to an aggregate flow path of the through the system (e.g., including a blower, a conduit leading from the blower to a device inlet, a path through the device, and a path exhausted from the device, etc.). The term "selectively coupled" indicates that the flow from the oxidant circuit to the transfer cell can be opened or closed as desired (e.g., through manual adjustment or by a system automation controller operating a valve, etc.). In such systems, a third mode of operation may be provided in which an electrical load is placed on the electrochemical transfer cell, oxidant is flowed through the oxidant flow circuit along a first electrode of the electrochemical transfer cell, and hydrogen is flowed through the hydrogen flow circuit along a second electrode of the electrochemical transfer cell, such that electrical current is supplied from the electrochemical transfer cell to the electrical load. The electrochemical transfer cell can thus be used as a fuel cell to generate power (e.g., to supplement the power generation of the main fuel cell).

In this example, the first electrode refers to the electrode of the cell that receives concentrated hydrogen when the cell is used as an electrochemical hydrogen separator. The second electrode refers to the electrode from which hydrogen is pumped when the cell is used as an electrochemical hydrogen separator. It is generally preferred, however, for the oxidant to flow along the second electrode and for the hydrogen from the storage vessel to be contacted with the first electrode. One reason for this general preference is that in some cases (e.g., where reformate is used), the oxidant can be flowed through the second electrode chamber of the cell without needing to purge the chamber of hydrogen to avoid exothermic reaction of oxygen and hydrogen that could damage the cell. In other cases, depending on the gas concentrations of the oxidant stream and of the electrochemical cell, it may be desirable to purge the cell (e.g., with an inert gas such as nitrogen) prior to injecting the oxidant.

In some embodiments, it is generally preferable to remove water vapor from the hydrogen stored in the hydrogen vessel to avoid freezing or corrosion problems. As an example, it may be desirable to lower the dew point of the hydrogen in the vessel to less than 30° C. below zero. In some embodiments, this may be accomplished by flowing the hydrogen across a desiccant material, such as a coupled between the electrochemical transfer cell and the hydrogen storage vessel. Examples of suitable desiccant materials include molecular sieves, silica gels, clays, and blends of these materials. Such materials include, for example, X- or Y-type zeolites (available from Linde Division of UOP), silica gels (available from Davison Division of W. R. Grace), indicating silica gels (available from IMPAK Corp.), Montmorillonite clays (available from IMPAK Corp.), calcium oxide, and calcium sulfate.

In some embodiments, two parallel conduits can be provided between the electrochemical transfer cell and the hydrogen storage vessel. For example, when one desiccant material in one conduit becomes saturated, the second desiccant material in the second conduit can be used. Where the transfer cell or fuel cell relies on polymer electrolyte membranes that require humidification, it may be desirable to humidify the hydrogen provided from the storage vessel to fuel cell, or the transfer cell when it is used as a fuel cell. In some embodiments, humidification can be accomplished by flowing the hydrogen from the storage vessel across a saturated desiccant material (heated if necessary). It may be desirable to size the alternating parallel desiccant beds such that the cycle frequency is less than the electrical power demand cycle on the fuel cell system to which they are connected.

In another aspect, the invention provides a fuel cell system including a first fuel cell having a hydrogen flow circuit and an oxidant flow circuit, wherein the hydrogen flow circuit comprises a hydrogen supply conduit coupled to an anode chamber of the first fuel cell, wherein the anode chamber is further coupled to a hydrogen exhaust conduit, and wherein the anode chamber comprises an anode. The oxidant flow circuit comprises an cathode supply conduit coupled to a cathode chamber of the first fuel cell, wherein the cathode chamber is further coupled to a cathode exhaust conduit, and wherein the cathode chamber comprises a cathode. Various embodiments may include any of the features or aspects described herein.

A first electrical circuit selectively provides an electrical connection from a power supply to the first fuel cell, such that an electrical potential is formed between the anode and cathode when the first circuit is activated. A second electrical circuit selectively provides an electrical connection from an electrical load to the first fuel cell, such that electrical current is drawn from the first fuel cell to the electrical load when the second circuit is activated. A hydrogen storage vessel is coupled through a first valve to the cathode exhaust conduit. A third electrical circuit is coupled to the first valve, the third circuit being adapted to open the first valve when either of the first or second circuits are activated, and the third circuit being adapted to close the first valve when neither of the first or second circuits are activated. Various embodiments may include any of the features or aspects described herein.

In another aspect, the invention provides a fuel cell system wherein a fuel cell is coupled to a hydrogen conduit. An electrochemical hydrogen separator is coupled to the hydrogen conduit, the separator being further coupled to a hydrogen storage vessel, the separator being adapted to selectively transfer hydrogen from the hydrogen conduit to the hydrogen storage vessel. An electrochemical hydrogen expander is coupled to the hydrogen conduit, the expander being further coupled to the hydrogen storage vessel, and the expander being adapted to selectively transfer hydrogen from the hydrogen storage vessel to the hydrogen conduit. Various embodiments may include any of the features or aspects described herein.

In another aspect, the invention provides a fuel cell system, wherein a fuel cell is coupled to a hydrogen supply conduit and a hydrogen exhaust conduit. An electrochemical hydrogen separator is coupled to the hydrogen exhaust conduit, the separator being further coupled to a hydrogen storage vessel. The separator is adapted to selectively transfer hydrogen from the hydrogen exhaust conduit to the hydrogen storage vessel. An electrochemical hydrogen expander is coupled to the hydrogen supply conduit, the expander being further coupled to the hydrogen storage vessel, and the expander being adapted to selectively transfer hydrogen from the hydrogen storage vessel to the hydrogen supply conduit. Various embodiments may include any of the features or aspects described herein.

In another aspect, the invention provides a fuel cell system including a fuel cell, a reformer, a hydrogen flow circuit, a hydrogen storage vessel, and an electrochemical hydrogen expander. The reformer is coupled to the hydrogen flow circuit and adapted to provide reformate to the hydrogen flow circuit. The fuel cell and the electrochemical hydrogen expander are each coupled to the hydrogen flow circuit, wherein the electrochemical hydrogen expander is further coupled to the hydrogen storage vessel. An electrical circuit is coupled to the electrochemical hydrogen expander, the circuit being adapted to selectively draw an electrical current from the electrochemical hydrogen expander. The electrochemical hydrogen expander is adapted to transfer hydrogen from the hydrogen storage vessel to the hydrogen flow circuit in proportion to the current that is drawn by the electrical circuit from the electrochemical hydrogen expander. Various embodiments may include any of the features or aspects described herein.

In another aspect, the invention provides a method of operating a fuel cell system, including at least the following steps: (1) placing an electrical potential across a first fuel cell in a first mode of operation to transfer hydrogen from an anode chamber of the first fuel cell to a cathode chamber of the first fuel cell; (2) placing an electrical load across the first fuel cell in a second mode of operation to transfer hydrogen from the cathode chamber of the first fuel cell to the anode chamber of the first fuel cell; and (3) flowing air through the anode chamber of the first fuel cell and hydrogen through the cathode chamber of the first fuel cell in a third mode of operation to provide an electric current to a load coupled to the first fuel cell.

In one embodiment, an additional step includes supplying reformate from a reforming reactor to the anode chamber. In another embodiment, an additional step may include operating a compressor in the first mode of operation to pressurize a hydrogen storage vessel with the hydrogen transferred from the anode chamber to the cathode chamber. In another embodiment, and additional step may include: (1) transferring hydrogen in the first mode of operation from the cathode chamber to a hydrogen storage vessel; and (2) transferring hydrogen from the hydrogen storage vessel to a secondary hydrogen storage vessel. As an example, as previously indicated, the secondary hydrogen storage vessel is a portion of a vehicle propulsion system.

In another embodiment, an additional step includes: (1) monitoring an electrical load on a second fuel cell; (2)

switching the system to the first mode of operation when the load is below a first predetermined threshold; and (3) switching the system to the second mode of operation when the load is above a second predetermined threshold.

In other embodiments, additional steps may include flowing hydrogen from the anode chamber of the first fuel cell to a reforming reactor in the second mode of operation, or flowing hydrogen from the anode chamber of the first fuel cell to a second fuel cell in the second mode of operation. In still other embodiments, additional steps may include flowing the hydrogen from the cathode chamber of the first fuel cell across a desiccant, or humidifying the hydrogen in the cathode chamber of the first fuel cell, or flowing the hydrogen from the anode chamber of the first fuel cell through a humidifier.

In another aspect, the invention provides a method of operating a fuel cell system, including the following steps: flowing hydrogen from a hydrogen supply conduit through a fuel cell to provide an electric current to a load coupled to the fuel cell; actuating an electrochemical hydrogen separator in a first mode of operation of the system to transfer hydrogen from the hydrogen supply conduit to a hydrogen storage vessel; and actuating an electrochemical hydrogen expander in a second mode of operation of the system to transfer hydrogen from the hydrogen storage vessel to the fuel cell. Various embodiments may include any of the features, aspects, or additional steps described herein.

In another aspect, the invention provides a method of operating a fuel cell system, including the following steps: (1) flowing hydrogen from a hydrogen supply conduit through a fuel cell to provide an electric current to a load coupled to the fuel cell; (2) exhausting unreacted hydrogen from the fuel cell to a hydrogen exhaust conduit; (3) actuating an electrochemical hydrogen separator in a first mode of operation of the system to transfer hydrogen from the hydrogen exhaust conduit to a hydrogen storage vessel; and (4) actuating an electrochemical hydrogen expander in a second mode of operation of the system to transfer hydrogen from the hydrogen storage vessel to the fuel cell. Various embodiments may include any of the features, aspects, or additional steps described herein.

In another aspect, the invention provides a fuel cell system comprising a fuel cell coupled to a hydrogen conduit, and an electrochemical hydrogen separator coupled to the hydrogen conduit, the separator being further coupled to a hydrogen storage vessel, the separator being adapted to selectively transfer hydrogen from the hydrogen conduit to the hydrogen storage vessel. An outlet valve is coupled to the hydrogen storage vessel, the outlet valve being adapted to transfer hydrogen from the hydrogen storage vessel to a secondary hydrogen storage vessel. As an example, the secondary hydrogen storage vessel can be a portion of a vehicle propulsion system.

In another aspect, the invention provides a fuel cell system that utilizes a gas stream containing hydrogen and carbon monoxide (e.g., reformate or synthesis gas). An electrochemical hydrogen separator is coupled to the gas stream. Preferably, the electrochemical hydrogen separator uses a PBI ion exchange membrane so that there is not a concern with the carbon monoxide from the gas stream poisoning the separator cell. In other embodiments, a shift reactor or preferential oxidation stage may be provided as known in the art to remove the carbon monoxide.

A power supply coupled to the electrochemical hydrogen separator provides current as discussed herein, that is effective to separate hydrogen from the gas stream on one side (electrode) of the separator, to form pure hydrogen on another side (electrode) of the separator. The hydrogen from the separator is then utilized by a PEM fuel cell. In this way, reformate or synthesis gas can be used to power a PEM fuel cell without the concern of the carbon monoxide in the gas affecting the fuel cell. Another advantage of the PBI separator is that it does not require humidification like other types of PEM separator systems. It may thus be desirable to humidify the hydrogen in a humidifier (e.g., steam injection or flowing across a water transport membrane or through an enthalpy wheel) to humidify the hydrogen prior to injecting it into the fuel cell. In some cases, for example where fuel cell lifetime is less of a concern, it may be acceptable to utilize the hydrogen without humidification.

The hydrogen may also be sent to a hydrogen storage vessel. The power used by the separator can be provided, as examples, by a battery or by the fuel cell. As in previous examples, one design aspect that may be included is an outlet valve coupled to the hydrogen storage vessel, where the outlet valve is adapted to transfer hydrogen from the hydrogen storage vessel to a secondary hydrogen storage vessel. As an example, the secondary hydrogen storage vessel can be a portion of a vehicle propulsion system. Thus, one system provided by the invention includes a stationary fuel cell system that purifies hydrogen from reformate to operate a fuel cell to power a house or building and to charge a hydrogen storage tank for other applications such as fueling a hydrogen powered vehicle.

Advantages and other features of the invention will become apparent from the following description, drawing and claims.

DETAILED DESCRIPTION

Figure 1:
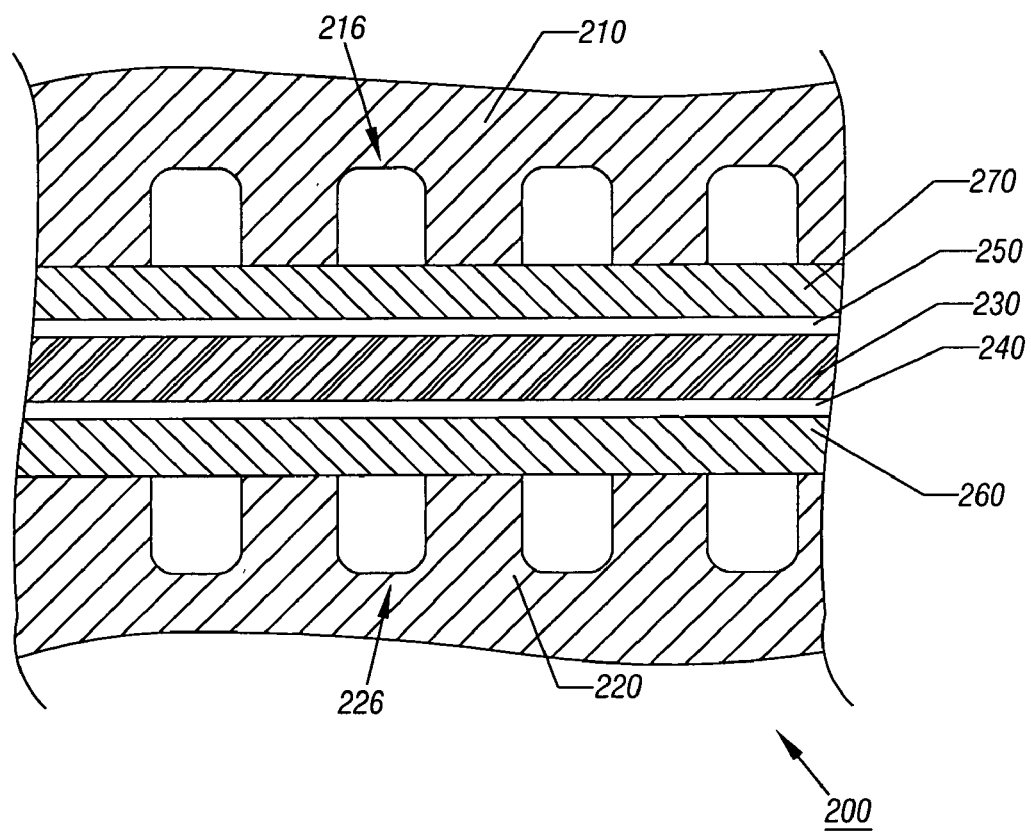
FIG. 1 is a cross-sectional view of a fuel cell.

FIG. 1 shows a cross-sectional view of a fuel cell 200. Fuel cell 200 includes a cathode flow field plate 210, an anode flow field plate 220, a solid electrolyte 230, catalysts 240 and 250 and gas diffusion layers 260 and 270. In the context of this invention, the terms cathode and anode are generally used in a relative sense merely to differentiate one electrode from another in an electrochemical cell. In PEM fuel cells, generally the cathode refers to the electrode that receives oxidant, and the anode refers to the electrode that receives hydrogen. In a fuel cell operating with such a configuration, the cathode generally has a positive polarity with respect to the anode. Therefore, cathode may also refer to a positively charged electrode, whereas anode may refer to a negatively charged electrode. However, under the present invention, the function and polarity of a given electrode may be changed in various operating modes, so that the terms cathode and anode may not always be descriptive of the polarity or function of an electrode at a given time (e.g., if the terms are used to refer to the electrode in its "standard" operating mode).

Electrolyte 230 should be capable of allowing ions to flow therethrough while providing a substantial resistance to the flow of electrons. Electrolyte 230 is a solid polymer (e.g., a solid polymer ion exchange membrane), such as a solid polymer proton exchange membrane (e.g., a solid polymer containing sulfonic acid groups). Such membranes are commercially available from E. I. DuPont de Nemours Company (Wilmington, Del.) under the trademark NAFION. Alternatively, electrolyte 230 can also be prepared from the commercial product GORE-SELECT, available from W. L. Gore & Associates (Elkton, Md.). Other suitable membrane materials include the polybenzimidazole (PBI) membrane available from Celanese, and polyether ether ketone (PEEK) membranes.

Catalyst 240 can be formed of a material capable of interacting with hydrogen to form protons and electrons. Examples of such materials include, for example, platinum, platinum alloys, and platinum dispersed on carbon black. Alternatively, the suspension is applied to the surfaces of gas diffusion layers 260 and 270 that face catalysts 240 and 250, respectively, and the suspension is then dried. The method of preparing catalyst 240 may further include the use of heat, pressure and temperature to achieve bonding. In some cases, catalyst 240 may include a mixture or alloy of platinum and ruthenium as known in the art to prevent the poisoning of the platinum by carbon monoxide that may be present in the anode fuel stream flowed through anode plate 220.

Catalyst 250 can be formed of a material capable of interacting with oxygen, electrons and protons to form water. Examples of such materials include, for example, platinum, platinum alloys, and noble metals dispersed on carbon black. Catalyst 250 can be prepared as described above with respect to catalyst 240.

Gas diffusion layers 260 and 270 are generally formed of a material that is both gas and liquid permeable material so that the reactant gases (e.g., hydrogen and oxygen) and products (e.g., water) can pass therethrough. For example, layers 260 and 270 may be a carbon fiber paper or cloth, and in some cases may be treated with a hydrophobic material such as Teflon™ to enhance water transport. In addition, layers 260 and 270 should be electrically conductive so that electrons can flow from catalysts 240 and 250 to flow field plates 220 and 210, respectively.

Figure 2:
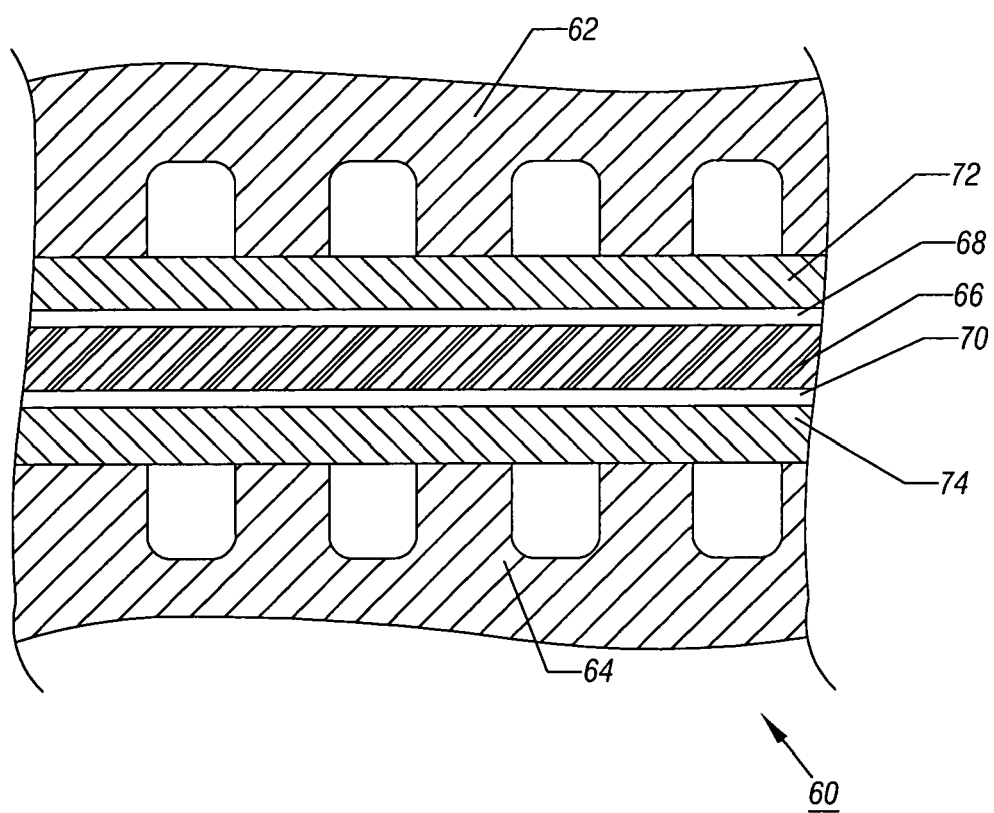
FIG. 2 is a cross-sectional view of an electrochemical transfer cell that may be used as an electrochemical hydrogen separator, or as an electrochemical hydrogen expander.

FIG. 2 shows an embodiment of an electrochemical transfer cell 60. In this example, the transfer cell 60 can share the same components as fuel cell 200. Other configurations are possible. Electrochemical transfer cell 60 includes a first flow field plate 62, a second flow field plate 64, an electrolyte 66, catalysts 68 and 70 and gas diffusion layers 72 and 74. Electrolyte 66 should be capable of allowing ions to flow therethrough while providing a substantial resistance to the flow of electrons. Electrolyte 66 is a solid polymer (e.g., a solid polymer ion exchange membrane), such as a solid polymer proton exchange membrane (e.g., a solid polymer containing sulfonic acid groups). Such membranes are commercially available from E. I. DuPont de Nemours Company (Wilmington, Del.) under the trademark NAFION. Alternatively, electrolyte 66 can also be prepared from the commercial product GORE-SELECT, available from W. L. Gore & Associates (Elkton, Md.). Other suitable membrane materials include the polybenzimidazole (PBI) membrane available from Celanese, and polyether ether ketone (PEEK) membranes.

Catalysts 68 and 70 can be formed of a material capable of interacting with hydrogen to form protons and electrons. Examples of such materials include, for example, platinum, platinum alloys, and platinum dispersed on carbon black. Catalyst layers 68 and 70 may be formed onto electrolyte 66. Alternatively, catalyst layers 68 and 70 may be applied to the surfaces of gas diffusion layers 72 and 74.

Gas diffusion layers 72 and 74 may be formed of a material that is both gas and liquid permeable material so that the fuel gas and any water condensing from the fuel gas or entrained therein can pass through the gas diffusion layers 72 and 74. Layers 72 and 74 should be electrically conductive so that electrons can flow from catalysts 68 and 70 to flow field plates 62 and 64, respectively. In some embodiments, the gas diffusion layers maybe omitted. In such cases, an electrical circuit such as a power source, or an electric load may be connected directly to either side of the membrane electrode assembly.

As previously discussed, an MEA refers to the sandwich of the electrolyte 66 within the catalyst layers 68 and 70. An MEA may be used with or without gas diffusion layers 72 and 74. Also, it will be appreciated that flow plates 62 and 64 are also not required features of a hydrogen pumping device. Other configurations are possible. For example, under the present invention it maybe desirable for the cell assembly 60 to be able to withstand high pressures (e.g., greater than 1000 psia, or greater than 3000 psia).

Figure 3:
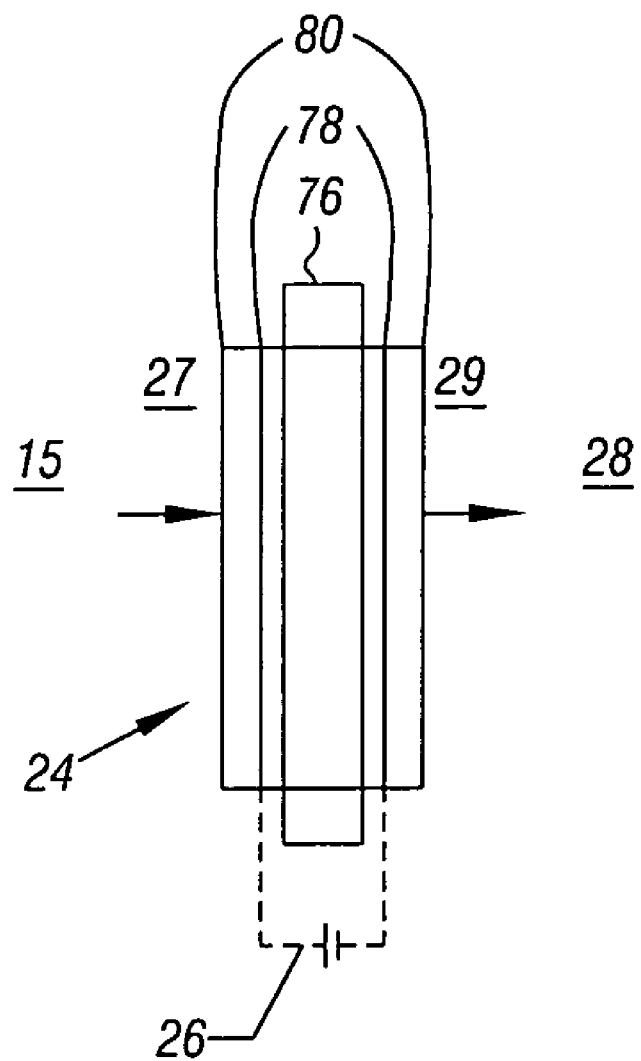
FIG. 3 is a schematic diagram of a portion of the electrochemical transfer cell of FIG. 2, operated in a first mode.

Referring to FIG. 3, a schematic diagram is shown of a portion of the electrochemical transfer cell 60 of FIG. 2. In this example, the electrochemical transfer cell is operated in a first mode as an electrochemical hydrogen separator (also referred to as a hydrogen pumping device). Fuel gas exhaust 15 is brought into contact with MEA 24. In the example shown in FIG. 3, MEA 24 includes electrolyte 76, electrode layers 78, and gas diffusion layers 80. Power source 26 applies a potential across MEA 24, inducing the following reaction of the hydrogen in the fuel gas exhaust 15 as it contacts catalyst layer 78:

$$H_2 \rightarrow 2H^+ + 2e^- \qquad (3)$$

The protons from the reaction flow through the electrolyte 76, and the electrons flow around the MEA 24 to re-form hydrogen according to the following reaction:

$$2H^+ + 2e^- \rightarrow H_2 \qquad (4)$$

The relationship of electrical potential between electrodes 27 and 29 formed across the cell is described by the Nernst equation:

$$E = E0 + (RT/nF) * \log 10(P1/P2) \qquad (5)$$

E—measured voltage;
E0—reactant equilibrium potential
R—universal gas constant;
T—temperature;
n—number of electrons transferred;
F—Faraday constant;
P1—hydrogen partial pressure of hydrogen pumping device effluent; and
P2—partial pressure of hydrogen in the fuel gas exhaust stream.

Effluent 28 from hydrogen pumping device 24 is substantially pure hydrogen because other components of fuel exhaust gas 15 are not passed through the MEA 24. The amount of hydrogen transported through MEA 24 depends on the amount of current supplied by power source 26. Referring to the direction of hydrogen flow, the MEA 24 has an anode side 27 and a cathode side 29. Electrode 27 generally has a positive polarity in this function, whereas electrode 29 generally has a negative polarity.

This current from power supply 26 provides an exact quantity of hydrogen transfer from the anode electrode 27 (hydrogen source side) to the cathode side 29. The hydrogen source for the hydrogen pump anode can be pure hydrogen or a mixture of hydrogen and other non-reactive gases. A natural gas reformate is an example of a hydrogen source. Reformate may also be provided from other hydrocarbon sources. Synthesis gas (also referred to as "syn gas") may also be used as a hydrogen source (referring to a gas contain hydrogen and carbon monoxide), and is a commonly available component of chemical process infrastructure. The pressure of the source is not significantly important to the operation of the pump except that the voltage may be affected according to the Nernst equation (5) (e.g., 0.0295 volt per pressure decade) and diffusion of the non-reactive gases to the pump cathode will increase with increased source pressure. The pressure obtained on the hydrogen pump cathode is generally limited only by the structure of the cell. Differential pressures of 5000 psid have been demonstrated in single cell hardware, however, it is presently preferable to utilize a compressor to pressurize the hydrogen (e.g., into a storage vessel).

Figure 3A:
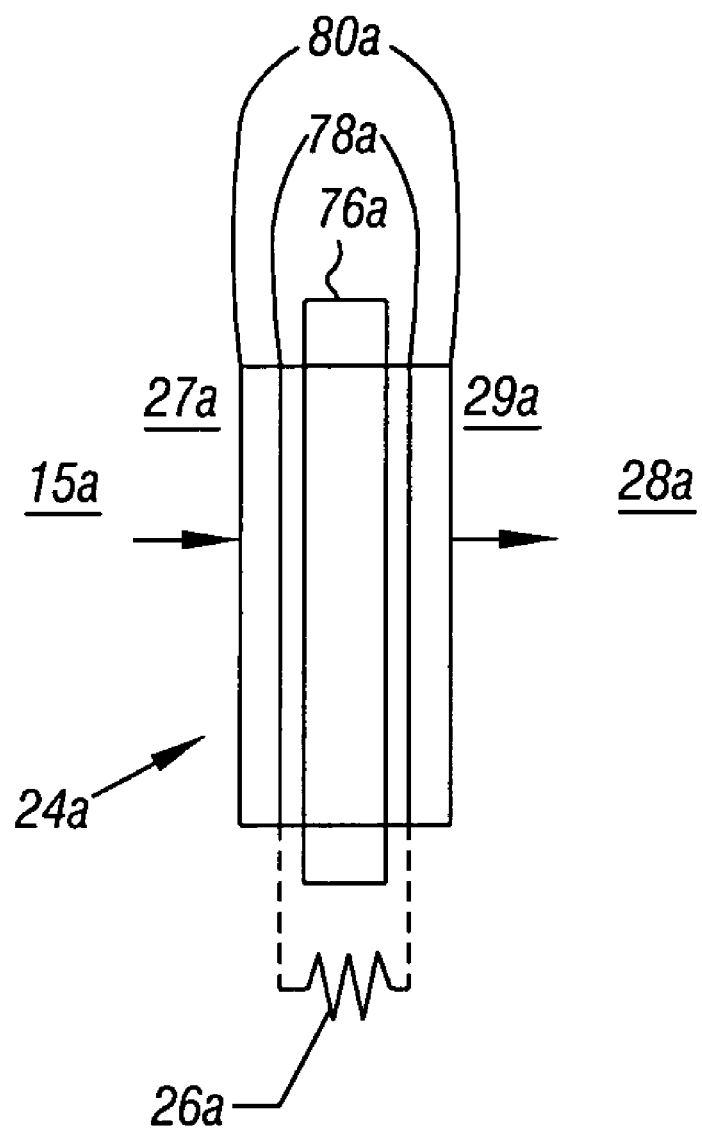
FIG. 3a is a schematic diagram of a portion of the electrochemical transfer cell of FIG. 2, operated in a second mode.

Referring to FIG. 3a, a schematic diagram is shown of a portion of the electrochemical transfer cell of FIG. 2, operated in a second mode. In this example, the electrochemical transfer cell is operated in a second mode as an electrochemical hydrogen expander. In the example shown in FIG. 3a, MEA 24a includes electrolyte 76a, electrode layers 78a, and gas diffusion layers 80a. Hydrogen gas 15a (e.g., from a hydrogen storage vessel) is brought into contact with MEA 24a. Hydrogen gas 28a on the low concentration side of MEA 24a generally has less hydrogen concentration than the hydrogen gas 15a.

The relationship of electrical potential between electrodes 27a and 29a formed across the cell is described by the Nernst equation (5). Electrode 27a generally has a negative polarity in this function, whereas electrode 29a generally has a positive polarity. Electrical load 26a draws current between electrodes 27a and 29a, inducing the reaction (3) above of the hydrogen in the fuel gas exhaust 15a as it contacts catalyst layer 78a.

The protons from the reaction flow through the electrolyte 76a, and the electrons flow around the MEA 24a to re-form hydrogen according to the reaction (4) above.

Effluent 28a from hydrogen expander 24a is substantially pure hydrogen. The amount of hydrogen transported through MEA 24a depends on the amount of current drawn by load 26a. Referring to the alternate use in some cases of MEA 24a as a fuel cell where electrode 29a is adapted to receive the oxidant, electrode 29a is generally referred to as the cathode and electrode 27a is generally referred to as the anode.

An example of the system shown in FIG. 3a, the low pressure hydrogen 28a might be natural gas reformate with a near ambient pressure, with a hydrogen partial pressure of ~6 psia. The pure high pressure hydrogen 15a might have a pressure of 600 psia. The cell would then develop a Nernst open circuit voltage of about 0.059 volt, as an example. At this voltage a resistive load can be applied to the cell and the flow of hydrogen across the MEA 24a will be exactly equivalent to the electrical current generated plus the normal membrane diffusion. Such a system provides various potential advantages over other designs. For example, in general, hydrogen can be more accurately metered with such a system, and the power generated by the expander can be used to supplement the power generation of the fuel cell system. Such a system may also be less expensive and more efficient than a turbine expander that could be used to generate power from the transfer of the high pressure hydrogen.

In another example, the pressure of pure hydrogen 15a might be lower, e.g., 25 psia, such that the Nernst potential formed across the cell is too low to use a current draw to transport hydrogen through the membrane 24a. In such cases, it may be desirable to replace the load 26a with a power supply and operate the cell as a hydrogen pump as described with respect to FIG. 3.

Figure 4:
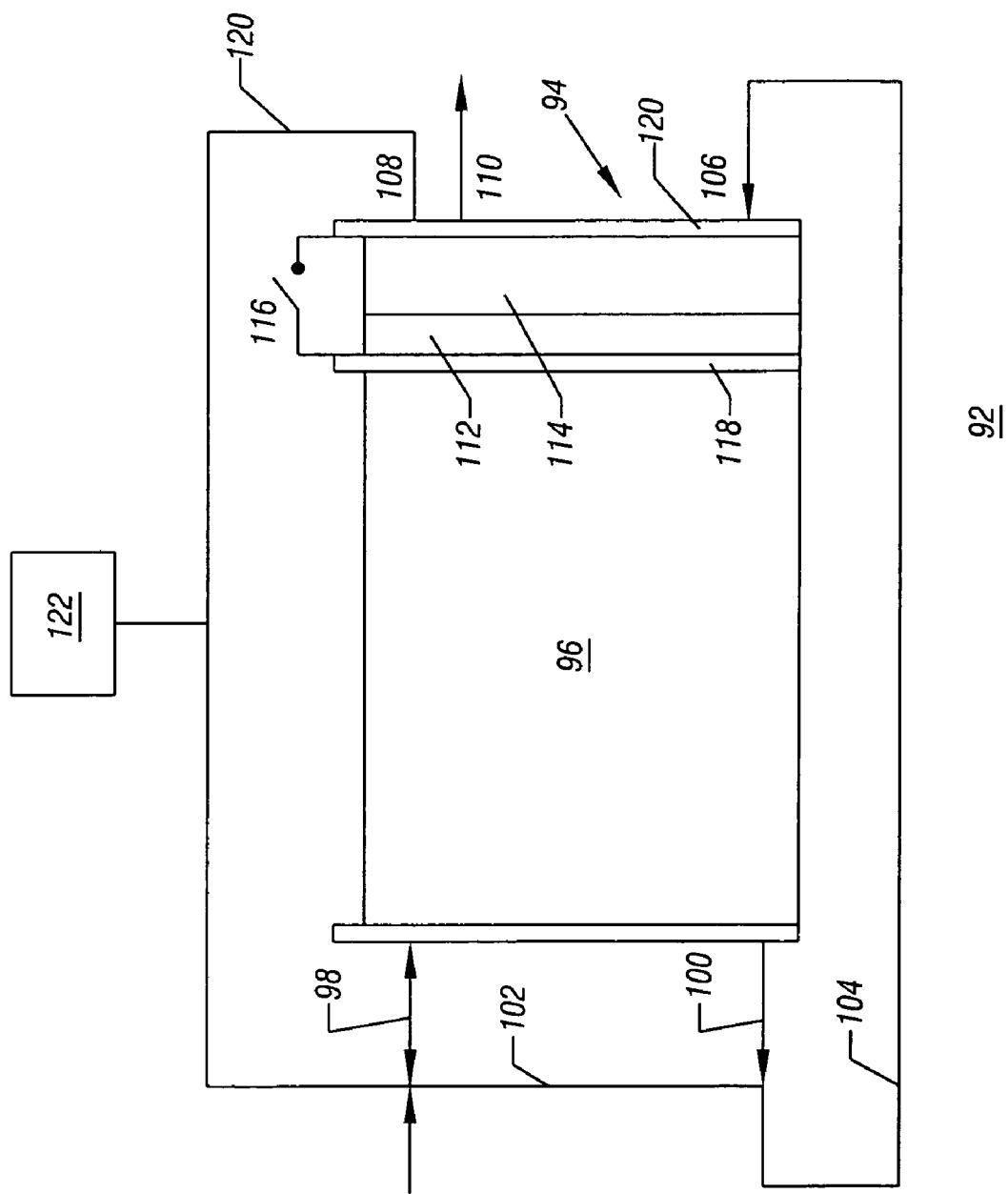
FIG. 4 is a schematic diagram of a fuel cell system with an electrochemical transfer cell.

Referring to FIG. 4, a schematic diagram is shown of a fuel cell system 92 with an electrochemical transfer cell 94 according to another embodiment of the invention. Fuel cell stack 96 has fuel inlet stream 98 and fuel outlet stream 100. In some embodiments, a first portion of the fuel outlet stream 100 is recirculated into fuel inlet stream 98 through first recirculation stream 102. A second portion of fuel outlet stream 100 can be flowed in a second recirculation stream 104 to electrochemical transfer cell 94. Subsystem 94 has a subsystem inlet 106, a subsystem outlet 108, and a vent 110. When the transfer cell 94 is used as a hydrogen separator, vent 110 disposes of what remains of second recirculation stream 104 after it has passed through subsystem 94. In some embodiments, subsystem 94 can have at least one power supplying fuel cell 112 and at least one transfer cell 114.

Subsystem 94 may also have an activation switch 116 connected to electrical connectors 118 and 120. While power supplying fuel cell 112 is part of the fuel cell stack 96, it is electrically separated by electrical connector 118. In other words, when fuel cell stack 96 is in operation and switch 116 is closed, the power supplying fuel cell 112 generates a voltage potential across electrical connectors 118 and 120. In this way, a potential is provided across hydrogen pumping device 114 to induce hydrogen pumping. Where switch 116 is opened, the second recirculation stream 104 passes through subsystem 94 and out vent 110 without having hydrogen in stream 104 removed by the hydrogen pumping device.

For example, a voltage of 0.5 VDC across fuel cell 112 may result in about 7.5 cubic centimeters of hydrogen being "pumped" through hydrogen pumping device 114 for each amp of current flow.

Subsystem effluent stream 120 is connected to hydrogen storage device 122 and to the fuel inlet stream 98 of the stack 96. The subsystem effluent stream 120 and hydrogen storage device 122 may have various valve configurations. Hydrogen storage device 122 may be, for example, a pressure vessel. Where it is desired to charge the pressure of hydrogen storage device 122, the current supplied to fuel cell 112 may be selected to produce a sufficient amount of hydrogen to result in the desired pressure. A compressor may also be used to maintain a desired hydrogen pressure in vessel 122.

When the transfer cell 94 is used as a hydrogen expander, an electrical load is placed on cell 94 (e.g., a load that is also normally placed on the fuel cell 96), and the cell 94 receives hydrogen from storage vessel 122, and expands it into stream 106, as an example, for utilization by the fuel cell 96.

Figure 5:
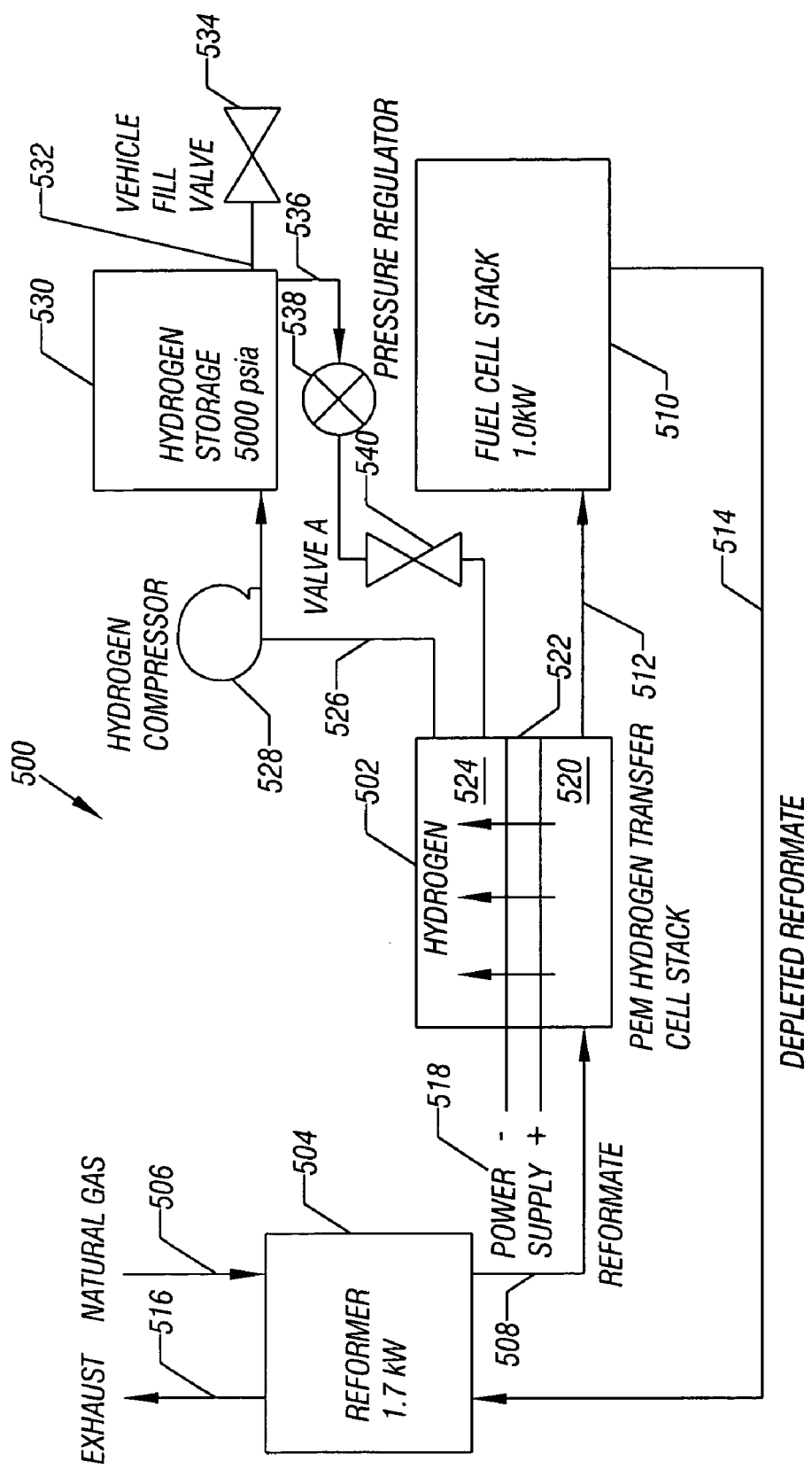
FIG. 5 is a schematic diagram of a fuel cell system with an electrochemical transfer cell operated in a hydrogen separator mode.

Referring to FIG. 5, a schematic diagram is shown of a fuel cell system with an electrochemical transfer cell operated in a hydrogen separator mode. A fuel processor 504 receives a flow of natural gas 506 and converts it to a hydrogen rich reformate that is flow via hydrogen supply conduit 508 through transfer cell 502, and to fuel cell stack 510 via conduit 512. In this example, for simplicity, the air flow to the fuel cell stack 510 is not shown. A portion of the hydrogen in the reformate is reacted in the fuel cell stack and the unreacted portion of the reformate is exhausted via conduit 514 to fuel processor 504. In this example, a portion of the reformate exhaust 514 is recirculated through the reformer 504, and the remaining reformate exhaust from conduit 514 is exhausted from the system via conduit 516 (e.g., to an oxidizer).

The discussion associated with FIG. 3 illustrates the theory of operation of electrochemical transfer cell 502. Power supply 518 causes hydrogen to be pumped from a reformate side 520 of transfer cell MEA 522 to an opposite side 524. The hydrogen is exhausted from the cell 502 via conduit 526 to a compressor 528 that charges hydrogen storage vessel 530 at a desired pressure. In this example, the pressure is about 5000 psia. Other pressure configurations may also be implemented.

The storage vessel 530 has an outlet 532 coupled to valve 534 that can be used to supply hydrogen from the storage vessel 530 to an external application. One such application can include a hydrogen tank associated with a hydrogen powered vehicle. In such a configuration, the system 500 can be a residential fuel cell system, for example, to provide power to a residence. A hydrogen powered car (e.g., the hydrogen be used by the vehicle's propulsion system) can be fueled with hydrogen from valve 534.

Systems and methods under the present invention may also be used in combined heat and power (CHP) systems. For example, the system may include a coolant circuit adapted to transfer heat from the system to a heat sink. Heat may be removed during operation from the fuel cell, the reformer, an exhaust gas oxidizer, or other components that may be present. A heat sink may include, as examples, a industrial and potable hot water tanks, heat exchangers for external applications, air heating systems for homes or buildings, etc.

In this example, the storage vessel 530 also includes an outlet conduit 536 connected to pressure regulator 538, which leads to valve 540, which in this example feeds back into transfer cell 502 when the valve 540 is open. Pressure regulator 538 can be adjusted to provide a desired pressure from storage vessel 530.

As an example, the system 500 may include a controller (not shown) to automate the operation of the system 500. The controller may cause the system 500 to operate with the electrochemical transfer cell 602 in the hydrogen separator mode when there is a surplus of hydrogen from the fuel processor 504. For example, the controller may monitor a load on the fuel cell stack 510, and activate the power supply 518 when the load is below a predetermined threshold with respect to the amount of hydrogen produced by the fuel processor 504 (e.g., when the fuel processor is producing in excess of 120% of the stoichiometric amount of hydrogen required by the load). The transfer cell may also have a dead band in which it is not operated, either because the load on the stack 510 is appropriate for the amount of hydrogen produced by the fuel processor 504, or because the hydrogen storage vessel 530 is full.

Figure 6:
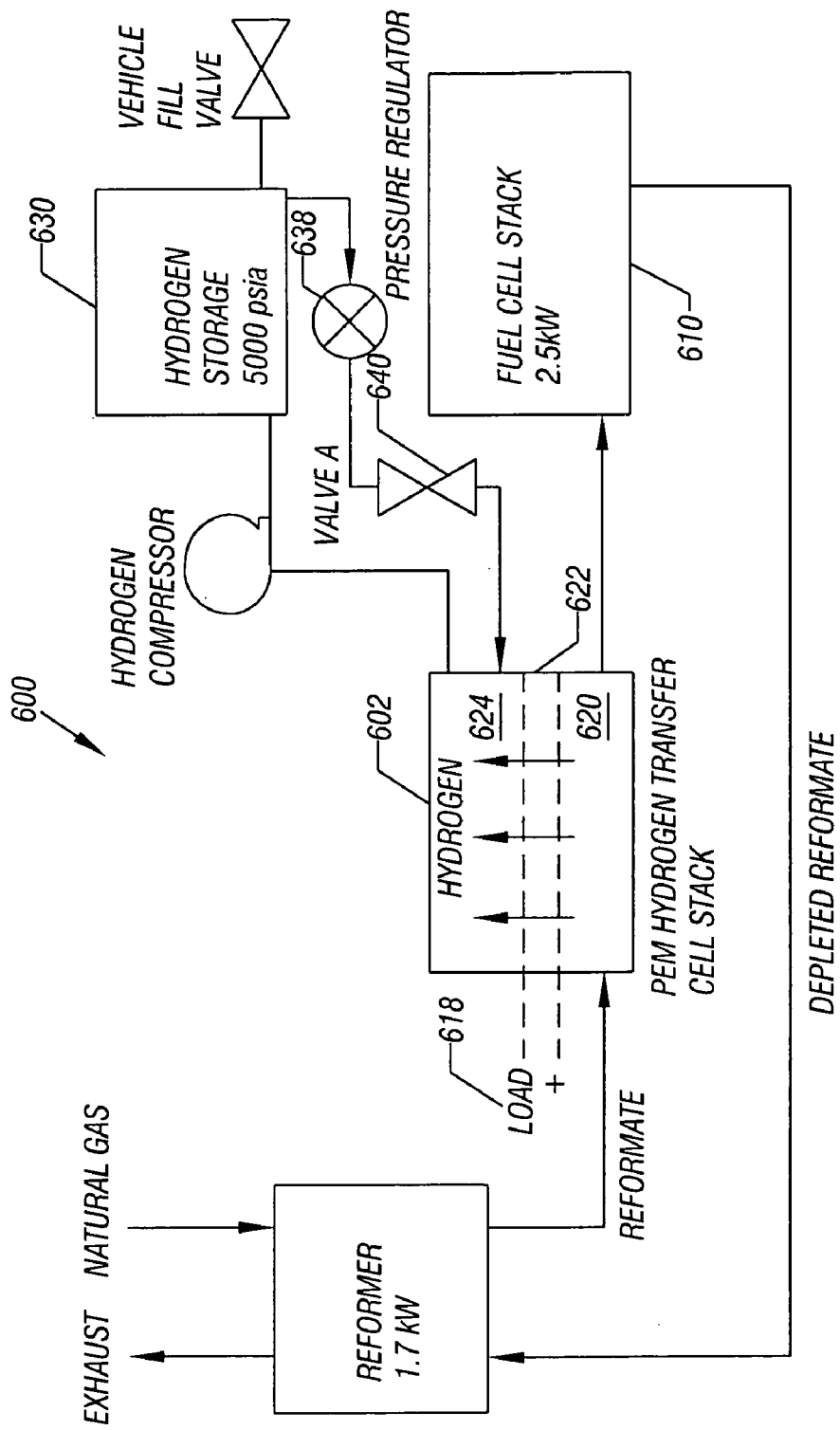
FIG. 6 is a schematic diagram of a fuel cell system with an electrochemical transfer cell operated in a hydrogen expander mode.

Referring to FIG. 6, a schematic diagram is shown of a fuel cell system 600 with an electrochemical transfer cell 602 operated in a hydrogen expander mode. The system 600 is otherwise similar to the system discussed with respect to FIG. 5. For example, a system controller as discussed with respect to FIG. 5 may cause the load 618 to be activated on the transfer cell 602 to initiate the hydrogen expander mode of operation to supply additional hydrogen to fuel cell stack 610 (e.g., when the stoichiometric ratio of hydrogen provided to fuel cell stack 610 is less than 120% with respect to an electrical load on the stack. The discussion associated with FIG. 4 illustrates the theory of operation of electrochemical transfer cell 602.

In this mode of operation, valve 640 is opened to allow hydrogen from storage vessel 630 to enter side 624 of transfer cell 602. In this example, the pressure regulator is set to provide the cell 602 with 1000 psia of hydrogen. The hydrogen is transferred through MEA 622 to side 620 of transfer cell 602, where the hydrogen is fed to fuel cell stack 610.

While FIG. 6 has been described as a separate system from the system discussed with respect to FIG. 5, it will be appreciated that in some embodiments, the systems 500 and 600 can be the same set of components operated in a different configuration. For example, power supply 518 may represent a first circuit, and load 618 may represent a second circuit that can be placed on the same transfer cell. In other embodiments, it may be desirable to provide separate hydrogen separator and hydrogen expander subsystems (or only one or the other, depending on the application desired for the system).

Figure 7:
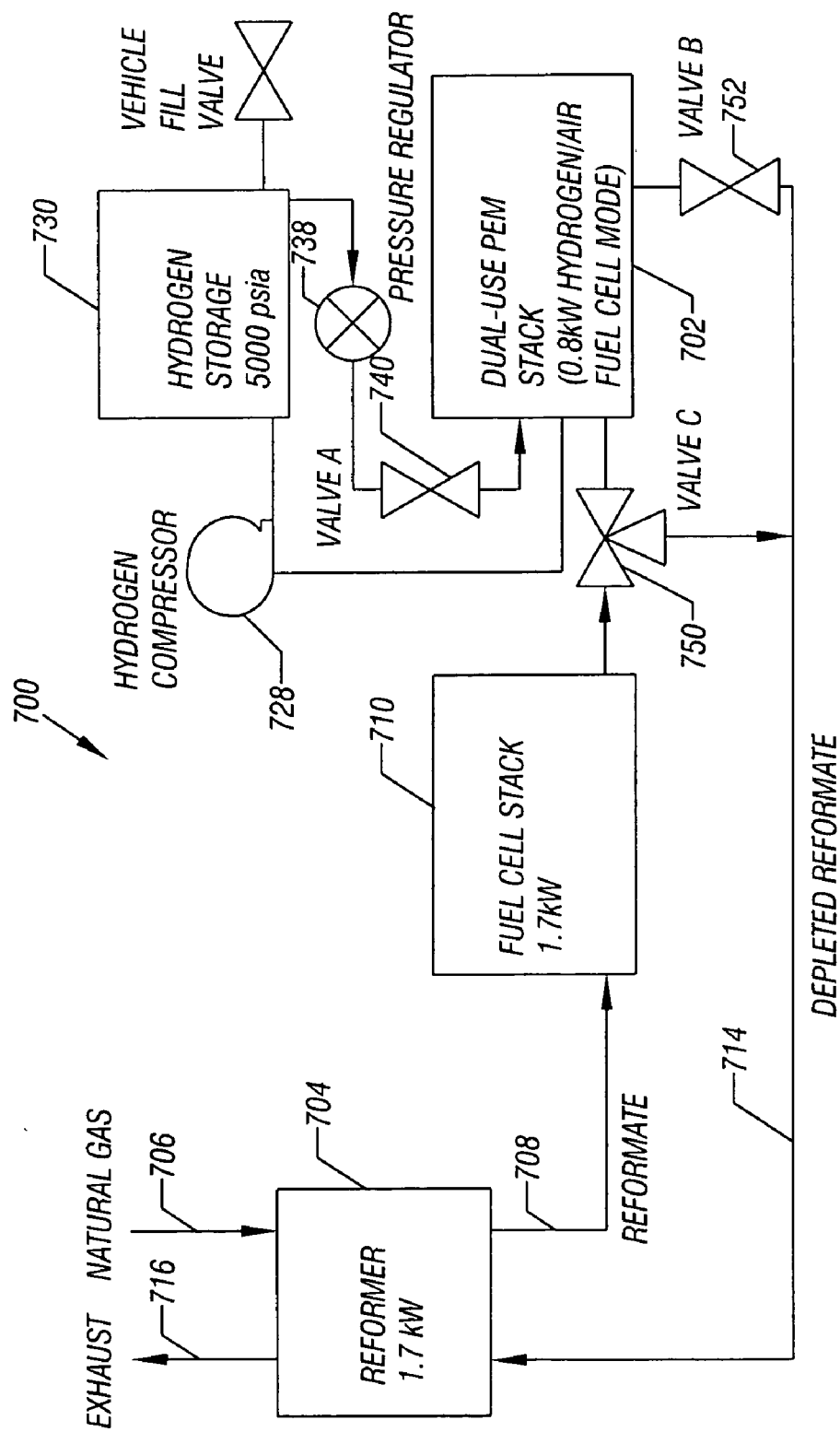
FIG. 7 is a schematic diagram of a fuel cell system with an electrochemical transfer cell operated in a hydrogen separator mode.

Referring to FIG. 7, a schematic diagram is shown of a fuel cell system with an electrochemical transfer cell operated in a hydrogen separator mode. A fuel processor 704 receives a flow of natural gas 706 and converts it to a hydrogen rich reformate that is flow via conduit 708 to fuel cell stack 710. In this example, for simplicity, the air flow to the fuel cell stack 710 is not shown. A portion of the hydrogen in the reformate is reacted in the fuel cell stack and the unreacted portion of the reformate is exhausted to a 3-way valve 750 to fuel processor 704 via conduit 714. In this example, a portion of the spent reformate 714 is recirculated through the reformer 704, and the remaining portion is exhausted from the system via conduit 716 (e.g., to an oxidizer). The valve 750 is closed with respect to the transfer cell 702, such that no reformate is supplied to the transfer cell.

In the mode of operation shown in FIG. 7, the electrochemical transfer cell 702 is operated as a fuel cell to generate power. The compressor 728 is generally not operated in this mode. Hydrogen from storage vessel 730 may be supplied via valve 740 and pressure regulator 738 to the cell 702 as needed (e.g., to satisfy the electric load on the fuel cell). In this example, the cell 702 is dead-headed, meaning that the pure hydrogen from storage vessel 730 is reacted in the cell without flowing through the cell (i.e., valve 752 is closed). The pure hydrogen gas input into the dual-use PEM stack 702 operating in the fuel cell mode may not have to be humidified if the peak load requirements are sufficiently limited that satisfactory lifetime will still be obtained since the cell 702 is only periodically operated.

Figure 8:
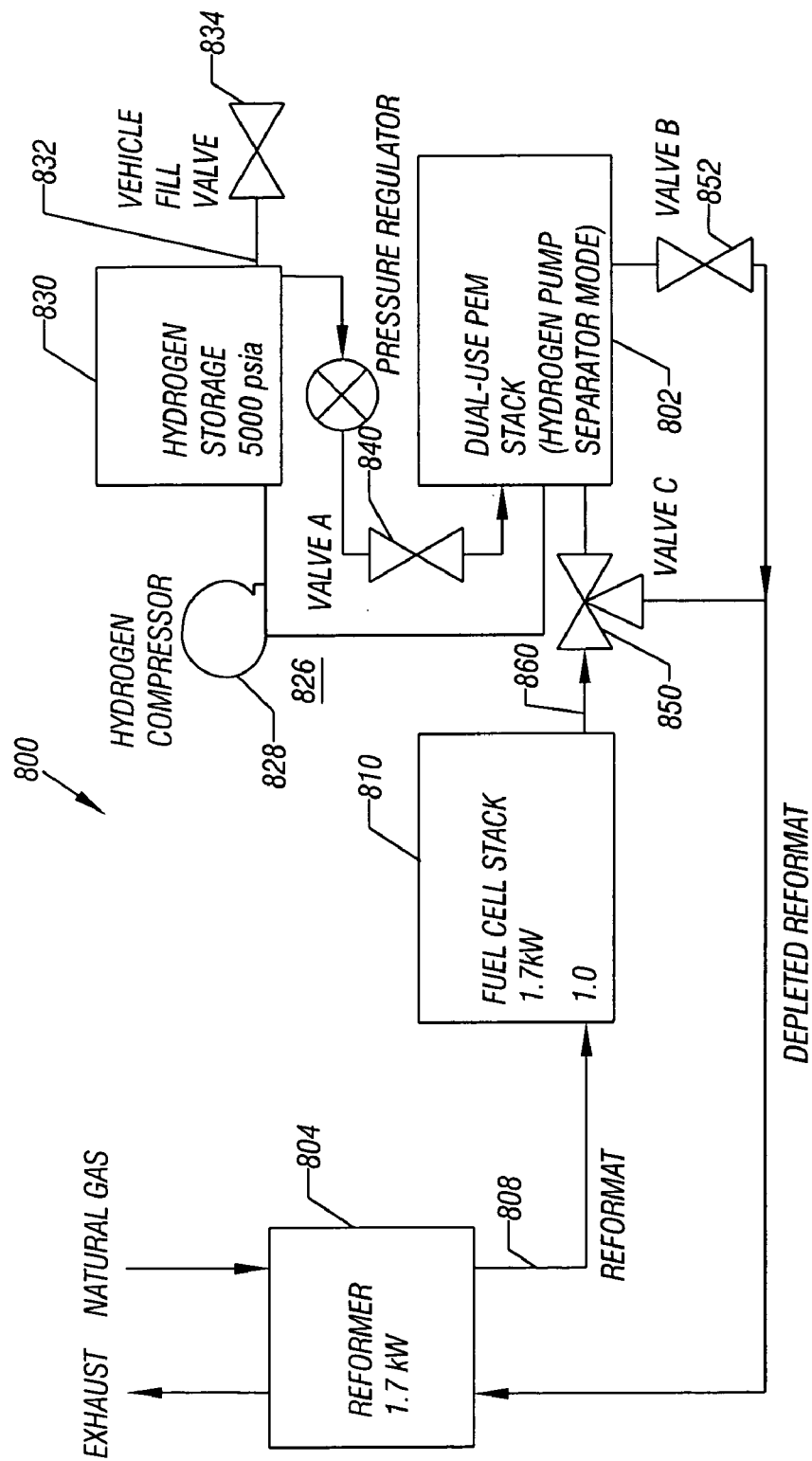
FIG. 8 is a schematic diagram of a fuel cell system with an electrochemical transfer cell operated in a hydrogen expander mode.

Referring to FIG. 8, a schematic diagram is shown of a fuel cell system 800 similar to that discussed with respect to FIG. 7, but wherein the electrochemical transfer cell 802 is operated in a hydrogen separator mode. A power supply (not shown) is connected to the transfer cell 802. Valve 850 is opened such that spent reformate from fuel cell 810 is fed to the transfer cell 802. Valve 850 is closed such that none of the spent reformate is bypassed to the reformer 804.

Residual hydrogen in the spent reformate is thus transferred via cell 802 to the hydrogen compressor 828, where it is fed to hydrogen storage vessel 830. Valve 840 is closed in this mode of operation to prevent hydrogen from vessel 830 from entering cell 802.

The storage vessel 830 has an outlet 832 coupled to valve 834 that can be used to supply hydrogen from the storage vessel 830 to an external application. One such application can include a hydrogen tank associated with a hydrogen powered vehicle. In such a configuration, the system 800 can be a residential fuel cell system, for example, to provide power to a residence. A hydrogen powered car (e.g., the hydrogen be used by the vehicle's propulsion system) can be fueled with hydrogen from valve 834. In this embodiment, the electrochemical transfer cell 802 refers to a cell that is used as a supplemental fuel cell in one mode of operation, and as a electrochemical hydrogen separator in another mode of operation. An electrochemical hydrogen expander is not utilized.

The reformate catalyst electrodes of the dual-use PEM stack 802 is able to use platinum without a ruthenium component because the carbon monoxide in the reformate is completely converted to carbon dioxide within the primary PEM reformate/air fuel cell 810. This allows the air to react alternately on the same catalyst electrodes within the dual-use PEM stack 802 without permanently damaging the electrodes by ruthenium oxidation during the reduction process. The pure hydrogen chamber of the PEM hydrogen pump separator 802 becomes the hydrogen fuel chamber for the cell 802 when it is operated as a fuel cell. This can eliminate the need to purge the cell with an inert gas such as nitrogen to avoid exothermic oxidation of hydrogen in the cell 802 when air is introduced.

In some embodiments, it is generally preferable to remove water vapor from the hydrogen stored in the hydrogen vessel 830 to avoid freezing or corrosion problems. As an example, it may be desirable to lower the dew point of the hydrogen in the vessel 830 to less than 30° C. below zero. In some embodiments, this may be accomplished by flowing the hydrogen across a desiccant material (not shown), such as a coupled between the electrochemical transfer cell 802 and the hydrogen storage vessel 830 (e.g., upstream from compressor 828). Examples of suitable desiccant materials include molecular sieves, silica gels, clays, and blends of these materials. Such materials include, for example, X- or Y-type zeolites (available from Linde Division of UOP), silica gels (available from Davison Division of W. R. Grace), indicating silica gels (available from IMPAK Corp.), Montmorillonite clays (available from IMPAK Corp.), calcium oxide, and calcium sulfate.

In some embodiments, two parallel desiccant conduits (not shown) can be provided between the electrochemical transfer cell 802 and the hydrogen storage vessel. For example, when one desiccant material in one conduit becomes saturated, the second desiccant material in the second conduit can be used (e.g., a valve switches the hydrogen flow from one desiccant conduit to another). It may be desirable to size the alternating parallel desiccant beds such that the cycle frequency is less than the electrical power demand cycle on the fuel cell system to which they are connected.

Where the transfer cell 802 or fuel cell 810 relies on polymer electrolyte membranes that require humidification, it may be desirable to humidify the hydrogen provided from storage vessel to fuel cell 810 or transfer cell 802 when it is used as a fuel cell. In some embodiments, humidification can be accomplished by flowing the hydrogen from the storage vessel across a saturated desiccant material (heated if necessary). For example, the flow from the storage vessel 830 may be routed through a desiccant conduit that has been previously saturated with water. In some cases, an electric heater in the desiccant material can enhance the water that is transferred from the saturated desiccant to the dry hydrogen. The hydrogen may also be humidified by more convention means, such as by combining it with steam or passing it across a membrane humidifier. In still other embodiments, depending on the lifetime requirements of the fuel cell 810 or of transfer cell 802, it may be acceptable to use dry hydrogen even though this may result in some degradation of performance.

It will be appreciated that while the present discussion is generally focused on the components that comprise various systems under the present invention, the invention may also be illustrated in terms of methods for operating such components. For example, referring to FIG. 8, such a method might include the following steps: (1) flowing hydrogen from a hydrogen supply conduit 808 through a fuel cell 810 to provide an electric current to a load coupled to the fuel cell; (2) exhausting unreacted hydrogen from the fuel cell to a hydrogen exhaust conduit 860; (3) actuating an electrochemical hydrogen separator 802 in a first mode of operation to transfer hydrogen from the hydrogen exhaust conduit 860 to a hydrogen storage vessel 830 (e.g., via conduit 826); and (4) actuating an electrochemical hydrogen expander (see, e.g., FIGS. 3a and 6) in a second mode of operation of the system to transfer hydrogen from the hydrogen storage 830 vessel to the fuel cell 810.

Such operating methods associated with the systems described herein may include and of the features or aspects discussed herein. For example, such methods may include any of the following additional steps, either alone or in combination: (a) operating a compressor to pressurize the hydrogen storage vessel with hydrogen from the electrochemical hydrogen separator; (b) transferring hydrogen from the hydrogen storage vessel to a secondary hydrogen storage vessel, such as a vehicle propulsion system; (c) monitoring the load coupled to the fuel cell, performing the step of actuating an electrochemical hydrogen separator when the load is below a first predetermined threshold, and performing the step of actuating an electrochemical hydrogen expander when the load is above a second predetermined threshold; (d) flowing hydrogen from the electrochemical hydrogen expander to a reforming reactor in the second mode of operation; (e) flowing hydrogen from the electrochemical hydrogen expander to the hydrogen supply conduit in the second mode of operation; (f) flowing the hydrogen from the electrochemical hydrogen separator across a desiccant; (g) humidifying the hydrogen transferred from the hydrogen storage vessel in the second mode of operation; and (h) flowing the hydrogen from the electrochemical hydrogen expander through a humidifier. Other methods and steps may also be provided.

While the invention has been disclosed with respect to a limited number of embodiments, those skilled in the art, having the benefit of this disclosure will appreciate numerous modifications and variations therefrom. It is intended that the invention covers all such modifications and variations as fall within the true spirit and scope of the invention.

What is claimed is:

1. A fuel cell system, comprising:
    a fuel cell, a hydrogen flow circuit, an electrochemical transfer cell, and a hydrogen storage vessel;
    wherein the fuel cell is adapted to receive hydrogen from the hydrogen flow circuit;

wherein the hydrogen storage vessel is coupled in fluid communication to the electrochemical transfer cell;
wherein the electrochemical transfer cell is adapted to transfer hydrogen from the hydrogen flow circuit to the hydrogen storage vessel when an electrical potential is placed on the cell;
wherein the electrochemical transfer cell is adapted to transfer hydrogen from the hydrogen storage vessel to the hydrogen flow circuit when an electrical load is placed on the cell;
wherein the system has a first operating mode in which the electrochemical transfer cell transfers hydrogen from the hydrogen flow circuit to the hydrogen storage vessel; and
wherein the system has a second operating mode in which the electrochemical transfer cell transfers hydrogen from the hydrogen storage vessel to the hydrogen flow circuit.

2. The fuel cell system of claim 1, further comprising a fuel processor coupled to the hydrogen flow circuit and adapted to supply reformate to the hydrogen flow circuit.

3. The fuel cell system of claim 1, further comprising a compressor coupled between the electrochemical transfer cell and the hydrogen storage vessel and adapted to pressurize the hydrogen storage vessel.

4. The fuel cell system of claim 3, further comprising:
a vessel outlet conduit coupled between the hydrogen storage vessel and the electrochemical transfer cell; and
a pressure regulator located along the vessel outlet conduit and adapted to regulate a pressure of hydrogen supplied to the electrochemical transfer cell from the hydrogen storage vessel.

5. The fuel cell system of claim 1, wherein the fuel cell is a stationary fuel cell, the system further comprising an outlet valve coupled to the hydrogen storage vessel, the outlet valve being adapted to transfer hydrogen from the hydrogen storage vessel to a secondary hydrogen storage vessel.

6. The fuel cell system of claim 5, wherein the secondary hydrogen storage vessel is a portion of a vehicle propulsion system.

7. The fuel cell system of claim 1, further comprising a controller adapted to switch the system between the first and second operating modes, wherein an electrical load is connected to the fuel cell, wherein the controller switches the system to the first mode when the load is below a first predetermined threshold, and wherein the controller switches the system to the second mode when the load is above a second predetermined threshold.

8. The fuel cell system of claim 1, wherein the hydrogen flow circuit is a hydrogen inlet conduit coupled to the fuel cell.

9. The fuel cell system of claim 1, wherein the hydrogen flow circuit is a hydrogen exhaust conduit coupled to the fuel cell.

10. The fuel cell system of claim 2, wherein an outlet of the electrochemical transfer cell is coupled to the fuel processor and adapted to supply hydrogen to the fuel processor.

11. The fuel cell system of claim 8, wherein an outlet of the electrochemical transfer cell is coupled to the hydrogen inlet conduit.

12. The fuel cell system of claim 1, further comprising a coolant circuit adapted to transfer heat from the system to a heat sink.

13. The fuel cell system of claim 1, further comprising:
an oxidant flow circuit selectively coupled to the electrochemical transfer cell; and
wherein the system has a third mode of operation in which an electrical load is placed on the electrochemical transfer cell, oxidant is flowed through the oxidant flow circuit along a first electrode of the electrochemical transfer cell, and hydrogen is flowed through the hydrogen flow circuit along a second electrode of the electrochemical transfer cell, such that electrical current is supplied from the electrochemical transfer cell to the electrical load.

14. The fuel cell system of claim 1, further comprising:
an oxidant flow circuit selectively coupled to the electrochemical transfer cell; and
wherein the system has a third mode of operation in which an electrical load is placed on the electrochemical transfer cell, oxidant is flowed through the oxidant flow circuit along a second electrode of the electrochemical transfer cell, and hydrogen is flowed through the hydrogen flow circuit along a first electrode of the electrochemical transfer cell, such that electrical current is supplied from the electrochemical transfer cell to the electrical load.

15. The fuel cell system of claim 1, further comprising a desiccant coupled between the electrochemical transfer cell and the hydrogen storage vessel.

16. The fuel cell system of claim 1, further comprising:
a first desiccant coupled between the electrochemical transfer cell and the hydrogen storage vessel along a first conduit; and
a second desiccant coupled between the electrochemical transfer cell and the hydrogen storage vessel along a second conduit.

17. A fuel cell system, comprising:
a first fuel cell having a hydrogen flow circuit and an oxidant flow circuit;
wherein the hydrogen flow circuit comprises a hydrogen supply conduit coupled to an anode chamber of the first fuel cell, wherein the anode chamber is further coupled to a hydrogen exhaust conduit, wherein the anode chamber comprises an anode;
wherein the oxidant flow circuit comprises an cathode supply conduit coupled to a cathode chamber of the first fuel cell, wherein the cathode chamber is further coupled to a cathode exhaust conduit, wherein the cathode chamber comprises a cathode;
a first electrical circuit selectively providing a electrical connection from a power supply to the first fuel cell, such that an electrical potential is formed between the anode and cathode when the first circuit is activated;
a second electrical circuit selectively providing an electrical connection from an electrical load to the first fuel cell, such that electrical current is drawn from the first fuel cell to the electrical load when the second circuit is activated;
a hydrogen storage vessel coupled through a first valve to the cathode exhaust conduit; and
a third electrical circuit coupled to the first valve, the third circuit being adapted to open the first valve when either of the first or second circuits are activated, the third circuit being adapted to close the first valve when neither of the first or second circuits are activated.

18. The fuel cell system of claim 17, further comprising a fuel processor coupled to the hydrogen flow circuit and adapted to supply reformate to the hydrogen flow circuit.

19. The fuel cell system of claim 17, further comprising a compressor coupled between the hydrogen storage vessel and the cathode exhaust conduit, the system being adapted to actuate the compressor when the first electrical circuit is activated.

20. The fuel cell system of claim 19, further comprising:
a vessel outlet conduit coupled between the hydrogen storage vessel and the fuel cell; and
a pressure regulator located along the vessel outlet conduit and adapted to regulate a pressure of hydrogen supplied to the fuel cell.

21. The fuel cell system of claim 17, wherein the fuel cell is a stationary fuel cell, the system further comprising an outlet valve coupled to the hydrogen storage vessel, the outlet valve being adapted to transfer hydrogen from the hydrogen storage vessel to a secondary hydrogen storage vessel.

22. The fuel cell system of claim 17, further comprising a controller adapted to activated the first electrical circuit when the load is below a first predetermined threshold, and activate the second electrical circuit when the load is above a second predetermined threshold.

23. The fuel cell system of claim 18, further comprising a second fuel cell, wherein an outlet of the first fuel cell is coupled to the fuel processor and adapted to supply hydrogen to the fuel processor when the first electrical circuit is activated.

24. The fuel cell system of claim 18, further comprising a second fuel cell, wherein an outlet of the first fuel cell is coupled to the second fuel cell and adapted to supply hydrogen to the second fuel cell when the first electrical circuit is activated.

25. A fuel cell system, comprising:
a fuel cell coupled to a hydrogen conduit;
an electrochemical hydrogen separator coupled to the hydrogen conduit, the separator being further coupled to a hydrogen storage vessel, the separator being adapted to selectively transfer hydrogen from the hydrogen conduit to the hydrogen storage vessel; and
an electrochemical hydrogen expander coupled to the hydrogen conduit, the expander being further coupled to the hydrogen storage vessel, the expander being adapted to selectively transfer hydrogen from the hydrogen storage vessel to the hydrogen conduit.

26. The fuel cell system of claim 25, further comprising a fuel processor coupled to the hydrogen conduit and adapted to supply reformate to the hydrogen conduit.

27. The fuel cell system of claim 25, further comprising a compressor coupled between the electrochemical hydrogen separator and the hydrogen storage vessel and adapted to pressurize the hydrogen storage vessel.

28. The fuel cell system of claim 27, further comprising:
a vessel outlet conduit coupled between the hydrogen storage vessel and the electrochemical hydrogen expander; and
a pressure regulator located along the vessel outlet conduit and adapted to regulate a pressure of hydrogen supplied to the electrochemical hydrogen expander.

29. The fuel cell system of claim 25, wherein the fuel cell is a stationary fuel cell, the system further comprising an outlet valve coupled to the hydrogen storage vessel, the outlet valve being adapted to transfer hydrogen from the hydrogen storage vessel to a secondary hydrogen storage vessel.

30. The fuel cell system of claim 25, wherein the hydrogen conduit is a hydrogen inlet conduit coupled to the fuel cell.

31. The fuel cell system of claim 25, wherein the hydrogen conduit is a hydrogen exhaust conduit coupled to the fuel cell.

32. The fuel cell system of claim 26, wherein an outlet of the electrochemical hydrogen expander is coupled to the fuel processor and adapted to supply hydrogen to the fuel processor.

33. The fuel cell system of claim 30, wherein an outlet of the electrochemical hydrogen expander is coupled to the hydrogen inlet conduit.

34. The fuel cell system of claim 25, further comprising a humidifier coupled between the hydrogen storage vessel and the electrochemical hydrogen expander, the humidifier adapted to humidify hydrogen flowed from the hydrogen storage vessel to the electrochemical hydrogen expander.

35. The fuel cell system of claim 25, further comprising a humidifier coupled between the electrochemical hydrogen expander and the hydrogen conduit, the humidifier adapted to humidify hydrogen flowed from the electrochemical hydrogen expander to the hydrogen conduit.

36. The fuel cell system of claim 25, wherein the electrochemical hydrogen separator is a fuel cell operated in a first mode, and the electrochemical hydrogen expander is the fuel cell operated in a second mode.

37. A fuel cell system, comprising:
a fuel cell coupled to a hydrogen supply conduit and a hydrogen exhaust conduit;
an electrochemical hydrogen separator coupled to the hydrogen exhaust conduit, the separator being further coupled to a hydrogen storage vessel, the separator being adapted to selectively transfer hydrogen from the hydrogen exhaust conduit to the hydrogen storage vessel; and
an electrochemical hydrogen expander coupled to the hydrogen supply conduit, the expander being further coupled to the hydrogen storage vessel, the expander being adapted to selectively transfer hydrogen from the hydrogen storage vessel to the hydrogen supply conduit.

38. The fuel cell system of claim 37, further comprising a fuel processor coupled to the hydrogen supply conduit and adapted to supply reformate to the hydrogen supply conduit.

39. The fuel cell system of claim 37, further comprising a compressor coupled between the electrochemical hydrogen separator and the hydrogen storage vessel and adapted to pressurize the hydrogen storage vessel.

40. The fuel cell system of claim 37, further comprising:
a vessel outlet conduit coupled between the hydrogen storage vessel and the electrochemical hydrogen expander; and
a pressure regulator located along the vessel outlet conduit and adapted to regulate a pressure of hydrogen supplied to the electrochemical hydrogen expander.

41. The fuel cell system of claim 37, wherein the fuel cell is a stationary fuel cell, the system further comprising an outlet valve coupled to the hydrogen storage vessel, the outlet valve being adapted to transfer hydrogen from the hydrogen storage vessel to a secondary hydrogen storage vessel.

42. The fuel cell system of claim 37, further comprising a humidifier coupled between the hydrogen storage vessel and the electrochemical hydrogen expander, the humidifier adapted to humidify hydrogen flowed from the hydrogen storage vessel to the electrochemical hydrogen expander.

43. The fuel cell system of claim 37, further comprising a humidifier coupled between the electrochemical hydrogen expander and the hydrogen conduit, the humidifier adapted to humidify hydrogen flowed from the electrochemical hydrogen expander to the hydrogen conduit.

44. The fuel cell system of claim 37, wherein the electrochemical hydrogen separator is a fuel cell operated in a first mode, and the electrochemical hydrogen expander is the fuel cell operated in a second mode.

45. A fuel cell system, comprising:
- a fuel cell, a fuel processor, a hydrogen flow circuit, a hydrogen storage vessel, and an electrochemical hydrogen expander;
- wherein the fuel processor is coupled to the hydrogen flow circuit and adapted to provide reformate to the hydrogen flow circuit;
- wherein the fuel cell and the electrochemical hydrogen expander are each coupled to the hydrogen flow circuit, wherein the electrochemical hydrogen expander is further coupled to the hydrogen storage vessel;
- an electrical circuit coupled to the electrochemical hydrogen expander, the circuit being adapted to selectively draw an electrical current from the electrochemical hydrogen expander;
- wherein the electrochemical hydrogen expander is adapted to transfer hydrogen from the hydrogen storage vessel to the hydrogen flow circuit in proportion to the current that is drawn by the electrical circuit from the electrochemical hydrogen expander.

46. The fuel cell system of claim 45, further comprising:
- a vessel outlet conduit coupled between the hydrogen storage vessel and the electrochemical hydrogen expander; and
- a pressure regulator located along the vessel outlet conduit and adapted to regulate a pressure of hydrogen supplied to the electrochemical hydrogen expander.

47. The fuel cell system of claim 45, wherein an outlet of the electrochemical hydrogen expander is coupled to the hydrogen flow circuit.

* * * * *